United States Patent
Tsuchiya et al.

[11] Patent Number: 6,030,658
[45] Date of Patent: Feb. 29, 2000

[54] RESIN COATING APPLICATOR FOR AN OPTICAL FIBER

[75] Inventors: Ichiro Tsuchiya; Kaoru Okuno; Hideo Miyaki; Kazumasa Oishi, all of Kanagawa, Japan

[73] Assignee: Sumitomo Electric Industries Ltd., Osaka, Japan

[21] Appl. No.: 09/023,281

[22] Filed: Feb. 13, 1998

[30] Foreign Application Priority Data

Feb. 14, 1997 [JP] Japan ..................... 9-030912

[51] Int. Cl.⁷ .................. B05D 5/06; B05C 3/02
[52] U.S. Cl. ............ 427/163.2; 118/405; 118/420; 427/356; 427/389.7; 427/434.6; 427/434.4; 427/434.7; 427/443.2
[58] Field of Search .............. 427/163.2, 434.2, 427/434.4, 434.6, 434.7, 443.2, 356, 389.7; 118/405, 420

[56] References Cited

U.S. PATENT DOCUMENTS

| | | | |
|---|---|---|---|
| 4,579,079 | 4/1986 | Nundy ................ | 118/405 |
| 5,127,361 | 7/1992 | Matsuda et al. ........ | 118/405 |
| 5,449,408 | 9/1995 | Koaizawa et al. ...... | 118/405 |
| 5,540,775 | 7/1996 | Milliman ............. | 118/405 |
| 5,843,231 | 12/1998 | Spencer et al. ....... | 118/420 |

FOREIGN PATENT DOCUMENTS

| | | |
|---|---|---|
| 0 198 561 A1 | 10/1986 | European Pat. Off. . |
| 0 229 934 | 7/1987 | European Pat. Off. . |
| 0 462 951 A1 | 12/1991 | European Pat. Off. . |
| 2 605 019 | 4/1988 | France . |
| 4-280839 | 10/1992 | Japan . |
| 6-55989 | 7/1994 | Japan . |

*Primary Examiner*—Janyce Bell
*Attorney, Agent, or Firm*—Pillsbury Madison & Sutro LLP

[57] ABSTRACT

In a resin coating applicator, a holder 14 is fixed on a base 15 fitted to a drawing machine, and in the holder 14, hot water can be circulated from an inlet 18. The inner circumferential surface of the holder 14 is formed into a tapered shape so that the outer circumferential surface of a cup-like member 4 of a cartridge type coating sub-assembly 1 is fitted to the holder 14. The respective outer circumferential surfaces of a nipple 2 and a coating die 3 are cylindrical so as to be fitted to the inner circumferential surfaces of an inner cylindrical member 6, and they are positioned by a step portion. Further, they are pressed from the upper and lower sides by the bottom portion of the cup-like member 4 and a lid member 5. The lid member 5 is fastened to the cup-like member 4 integrally by a thread.

7 Claims, 2 Drawing Sheets

RESIN COATING APPLICATOR FOR AN OPTICAL FIBER

BACKGROUND OF THE INVENTION

1. Field of the Invention

The present invention relates to an optical fiber coating applicator for applying resin coating onto an optical fiber, and particularly relates to a resin coating applicator for optical fibers, which is easy in maintenance.

2. Description of the Related Art

Conventionally, in manufacturing an optical fiber, a preform is heated and pulled so as to draw an optical fiber, and then the surrounding of the optical fiber is coated with resin or the like, cured by a curing apparatus, and wound up on a winding machine through a capstan, a pulley and so on. As the means for coating an optical fiber with resin, that which uses a nipple and a coating die is known. A coating applicator using a nipple and two coating dies for applying two coating layers is disclosed in Japanese Patent Unexamined Publication No. Hei-4-280839. Such an applicator for applying two coating layers by using two coating dies is also called a dual die. In addition, a coating applicator in which hot water is circulated around a coating die in order to control temperature of resin during application is disclosed in Japanese Patent Examined Publication No. Hei-6-55989.

In such a coating applicator, when resin grounds or rubbish foreign bodies exist in a coating die, the flow of resin is disturbed to cause deterioration in coating concentricity or cause a change in coating diameter. It is therefore preferable to regard a predetermined length of drawing as a batch, and cleaning/cleansing is performed whenever one batch is ended. In addition, preferably, the cleaning/cleansing of the coating die in every drawing batch is performed after the coating die is removed from the drawing machine and disassembled, for the resin path in the coating die is so complicated that it cannot be cleaned up if it is not disassembled. If it is disassembled, it can be cleaned up by ultrasonic cleaning with a solvent.

However, in the above-mentioned coating applicator disclosed in Japanese Patent Unexamined Publication No. Hei-4-280839, when removing and cleansing are performed every time, there is a problem that the coating die cannot be set in a pass line with high reproducibility in positioning accuracy because positioning and so on in attachment is left out of consideration. In addition, because the nipple is tapered so as to be fitted to the die holder, there is another problem that the gap between the nipple and the coating die cannot be managed accurately. In addition, because a first cylindrical coating die 27 has a structure that the concentricity is controlled by threads, there is a further problem that the control is not easy.

On the other hand, in the coating applicator disclosed in Japanese Patent Post-Examination No. Hei-6-55989, such a structure has been adopted that temperature can be controlled by the circulation of hot water, but removing from a pass line or cleaning/cleansing is left out of consideration.

As a result of further examination, it is found that the coating applicator disclosed in Japanese Patent Unexamined Publication No. Hei-4-280839 is removed while it is being disassembled, and attached to a pass line while it is being assembled, so long as viewed from the drawings, though a removal or attachment structure is not clearly described. In assembling, the coating applicator seems to be a system of fitting into a recess portion. If it is regarded as a simple fitting type, a clearance should be produced, so that it is difficult to install the coating applicator with high reproducibility even in its tilt and/or horizontal position. A resin introduction pipe is connected to the coating die, so that it is difficult on structure to reproduce the accuracy of the attachment tilt angle in the order of a few minutes because of its weight. Even if it is fixed by a thread, it is difficult to realize such an accuracy.

As for a circumferentially positioning mechanism disclosed in Japanese Patent Unexamined Publication No. Hei-4-280839, the reproducibility in attachment accuracy is left out of consideration. In addition, in a fitting structure where the outer circumferential surface of a nipple is tapered, its axial position with the upper surface of a cylindrical coating die laid under the nipple cannot be made accurate. As for the gap between the nipple and the coating die, therefore, there has not been shown a structure in which the gap between the nipple and the coating die can be defined accurately.

As has been described above, in conventional coating applicators, there is required such a working that a screw must be released to remove and clean a coating die whenever cleaning/cleansing working is performed, and at the time of assembling the screw must be fastened while making alignment. This working is not so easy.

SUMMARY OF THE INVENTION

Taking the foregoing situation into consideration, it is an object of the present invention to provide a resin coating applicator for an optical fiber using a cartridge type coating sub-assembly that allows a nipple and a coating die to be assembled outside of the coating applicator with high accuracy so as to make it easy to remove the cartridge type coating sub-assembly after every drawing, and superior reproducibility of a horizontal position and a tilt angle can be realized when the cartridge type coating sub-assembly is fitted in a pass line such as a drawing machine. In addition, it is another object to provide a resin coating applicator for an optical fiber in which a single positioning member is used to improve the accuracy in assembling, while temperature of the coating die can be controlled by circulation of hot water, etc., as required.

To achieve the above object, according to a first aspect of the invention, there is provided a resin coating applicator for an optical fiber, comprising:

a nipple;

a coating die;

a cartridge type coating sub-assembly into which said nipple and said coating die are disassemblably assembled; and a holder having a truncated-conical inner surface fixed to a pass line;

wherein said cartridge type coating sub-assembly has a truncated-conical outer surface fitted to said holder.

According to a second aspect of the invention, there is provided a resin coating applicator for an optical fiber, comprising:

a nipple having a cylindrical outer circumferential surface;

a coating die having a cylindrical outer circumferential surface;

a single positioning member;

a cartridge type coating sub-assembly comprising said nipple, said coating die and said single positioning member which are disassemblably assembled; and a holder having a truncated-conical inner surface fixed to a pass line;

wherein said single positioning member has an inner circumferential surface fitted to the respective cylindrical outer circumferential surfaces of said nipple and said coating die, and said cartridge type coating sub-assembly has a truncated-conical outer surface fitted to said holder.

According to a third aspect of the invention, there is provided a resin coating applicator for an optical fiber according to the second aspect, wherein said cartridge type coating sub-assembly and said holder have a circumferentially positioning means.

According to a fourth aspect of the invention, there is provided a resin coating applicator for an optical fiber according to the second aspect, wherein said coating die comprises a first coating die and a second coating die, and said first coating die and said second coating die have cylindrical outer circumferential surfaces respectively so as to be positioned by the single positioning member having inner circumferential surfaces fitted to the respective cylindrical outer circumferential surfaces of said nipple, said first and second coating dies.

According to a fifth aspect of the invention, there is provided a resin coating applicator for an optical fiber according to the second aspect, wherein said cartridge type coating sub-assembly comprises said nipple, said cartridge type coating sub-assembly, said single positioning member and a cup-like member having an inner circumferential surface fitted to the outer circumferential surface of said single positioning member.

According to a sixth aspect of the invention, there is provided a resin coating applicator for an optical fiber according to the second aspect, wherein a temperature control means is given to said holder.

According to a seventh aspect of the invention, there is provided a method of applying a resin coating for an optical fiber using a resin coating applicator for an optical fiber, comprising: a nipple having a cylindrical outer circumferential surface; a coating die having a cylindrical outer circumferential surface; a cartridge type coating sub-assembly into which said nipple and said coating die are disassemblably assembled; a single positioning member assembled into said cartridge type coating sub-assembly and having an inner peripheral surface fitted to the respective cylindrical outer surfaces of said nipple and said coating die; and a holder having a truncated-conical inner surface fixed to a pass line; said method comprising the steps of:

drawing the optical fiber from an upper side of said nipple toward the lower side of said coating die;

supplying a resin to a clearance between said nipple and said coating die to coat the optical fiber with the resin; and maintaining respective temperatures of said nipple and said coating die constant by a temperature controller disposed in said holder to control the temperature of the resin.

In the case where the cartridge type coating sub-assembly into which the nipple and the coating die are disassembly assembled is fitted into the holder fixed to the pass line, it is important to control the horizontal position and the tilt angle of the coating sub-assembly with respect to the pass line with high reproducibility substantially without any displacement every time the coating assembly is fitted into the holder. The prevent inventors have proved that a tolerance of the displacement is 20 to 30 $\mu$m in the horizontal position and 2 to 3 degrees in the tilt angle. This is a entire novel knowledge which has not been known up to now. In the resin coating applicator of the invention, the inner surface of the holder is tapered or conically truncated, and the outer surface of the cartridge type coating sub-assembly is configured to be fitted to the inner surface of the holder, to thereby control the displacement within the above tolerance.

When the fitting of the cartridge type coating sub-assembly to the holder is realized with the tapered surfaces thereof, it is desirable to accurately position the cartridge type coating sub-assembly to the holder in a circumferential direction. The present inventors have found that if the circumferential displacement is about 20 degrees, the reproducibility of the horizontal position and the tilt angle of the cartridge type coating sub-assembly with respect to the pass line is extremely excellent. This is an entire novel knowledge which has not been known. In the resin coating applicator of the invention, there is provided means for circumferentially positioning the cartridge type coating sub-assembly to control the circumferential displacement within about 20 degrees.

Also, the present inventors have found that, to improve the concentricity of the optical fiber and the coating resin and to reduce fluctuation in the coating diameter, it is important to control with high accuracy a clearance between the nipple and the coating die which is filled with the resin introduced thereinto. The present inventors also have found that the clearance should be controlled with accuracy (tolerance) of the several to 10 $\mu$m order. This is also an entire novel knowledge which has not yet been known. In the resin coating applicator of the invention, the nipple and coating die the respective outer surfaces of which are made cylindrical are positioned by a single positioning means having an inner surface that is fitted to those cylindrical outer surfaces to thereby control the clearance within the above tolerance.

DETAILED DESCRIPTION OF THE PREFERRED EMBODIMENTS

Now, a description will be given in more detail of preferred embodiments of the present invention with reference to the accompanying drawings.

Figure 1:
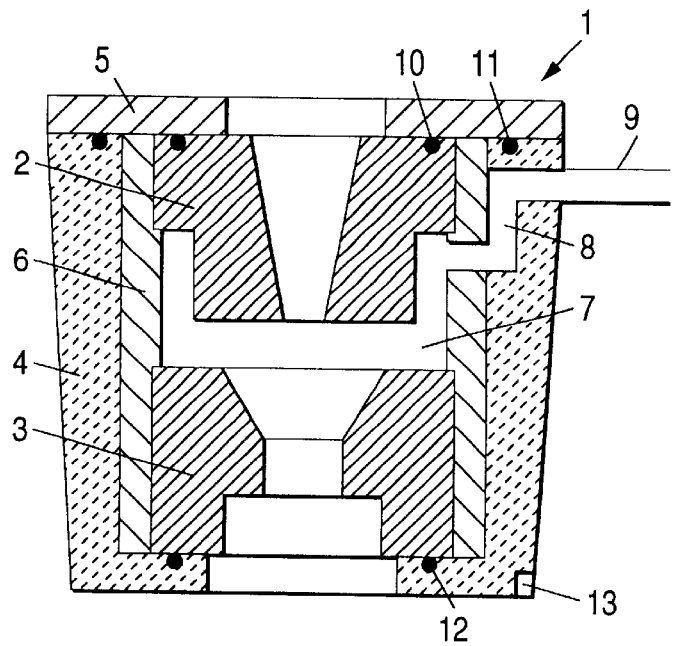
FIG. 1 is a sectional view showing a cartridge type coating sub-assembly used in a resin coating applicator for an optical fiber according to a first embodiment of the present invention.

FIG. 1 is a sectional view of a first embodiment of a cartridge type coating sub-assembly used in a resin coating applicator for an optical fiber according to the present invention. In FIG. 1, the reference numeral 1 represents a cartridge type coating sub-assembly; 2, a nipple; 3, a coating die; 4, a cup-like member; 5, a lid member; 6, an inner cylindrical member; 7, a gap portion; 8, a resin path; 9, a resin introduction port; 10 to 12, O-rings; and 13, a positioning groove.

The outer circumferential surfaces of the nipple 2 and the coating die 3 are formed to be cylindrical. Inner circumferential surfaces to be fitted to the respective cylindrical outer circumferential surfaces are formed in the inner cylindrical member 6. The nipple 2 and the coating die 3 are positioned by a step portion of the inner surfaces of the cylindrical member 6. Since a fitting clearance can be made to be about 2 to 3 μm, the concentricity between the nipple 2 and the coating die 3 can be reproduced with this accuracy. The height of the gap portion 7 between the nipple 2 and the coating die 3 is defined by the step portion of the inner cylindrical member 6, and its reproducibility can be made to be not more than 10 μm. Further, since the nipple 2 and the coating die 3 are pressed from their upper and lower portions respectively by the bottom portion of the cup-like member 4 and the lid member 5, there is no fear that the gap portion 7 is expanded by the pressure with which resin is supplied thereto. That is, the upper end surface of the nipple 2 is made to project upward slightly in the order of 0.1 mm, for example, 0.3 mm, over the upper end surface of the inner cylindrical member 6, while the lower end surface of the coating die 3 is made to project downward slightly over the lower end surface of the inner cylindrical member 6. The outer circumferential surface of the inner cylindrical member 6 is cylindrical so as to be fitted into the cylindrical inner circumferential surface of the cup-like member 4 so that fitting and assembling can be made with the accuracy of 10 μm or less. Even with such a order of accuracy in fitting, there is no fear that the axes of the nipple 2 and the coating die 3 are tilted in the fitting clearance, because the nipple 2 and the coating die 3 are pressed by the bottom surface of the cup-like member 4 and the lid member 5.

Although such a structure that the lid member 5 is fastened to the cup-like member 4 by a thread is adopted, a flange portion may be provided to be fastened. The resin path 8 is formed between the cup-like member 4 and the inner cylindrical member 6 so that resin is introduced from the resin introduction port 9 into the gap portion 7 between the nipple 2 and the coating die 3.

Although only one resin path 8 is illustrated, resin is put into the gap portion 7 from circumferentially uniformly provided several inlets practically. The O-rings 10 to 12 are provided to prevent the resin from leaking out of the cartridge type coating sub-assembly 1. Suitable material such as metal, resin or the like is used for the O-rings.

The outer circumferential surface of the cup-like member 4 is finished into a tapered shape. It can be regarded substantially as a truncated cone. The positioning groove 13 is formed in at least one place in its lower surface, so that the cartridge type coating sub-assembly 1 can be accurately positioned in the circumferential direction when the cartridge type coating sub-assembly 1 is fitted into a holder. That is, a desired positioning structure can be adopted. For example, a protrusion corresponding to the positioning groove 13 may be provided in a not-shown holder, or a positioning groove may be also formed on the holder side for positioning through a stopper.

Figure 2:
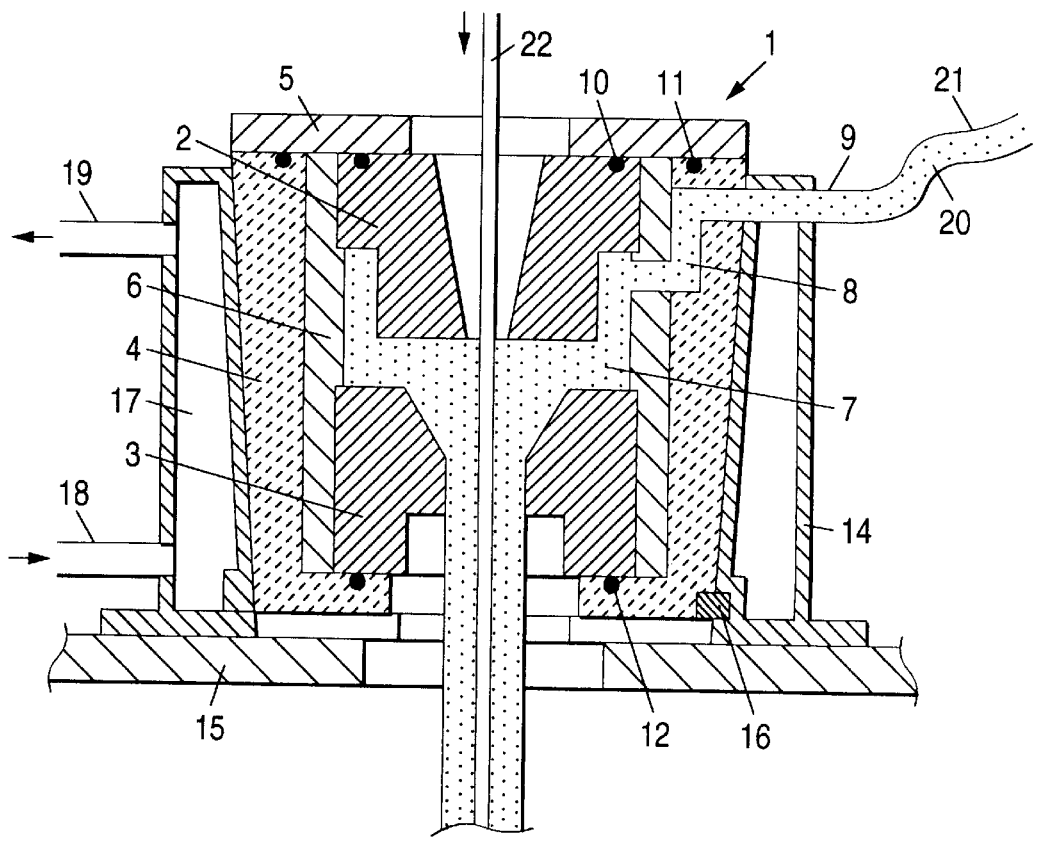
FIG. 2 is a model diagram for explaining the state in which the cartridge type coating sub-assembly in FIG. 1 has been fitted to a drawing machine.

FIG. 2 is a model diagram for explaining a state where a cartridge type coating sub-assembly is fitted into a holder fixed to a drawing machine or the like, and resin is applied to a drawn optical fiber. In FIG. 2, parts identical with those in FIG. 1 are indicated by the same references, and their description will be omitted. The reference numeral 14 represents a holder; 15, a base; 16, a pin; 17, a space portion; 18, a hot water inlet; 19, a hot water outlet; 20, resin; 21, a resin supply tube; and 22, an optical fiber.

The holder 14 is fixed onto the base 15 attached to a drawing machine. The inner circumferential surface of the holder 14 is formed into a tapered shape to be fitted to the outer circumferential surface of the cup-like member 4. The base 15 is supported so that its horizontal position and tilt angle can be controlled relatively to the drawing machine tower, but the controlling mechanism is not shown. When the holder 14 is adjustably fixed to the drawing machine, the horizontal position and tilt angle of the base 15 are controlled so that fluctuation in the coating diameter is reduced and the concentricity of the fiber and coating resin is superior when drawing is performed with the cartridge type coating sub-assembly 1 fitted thereto.

The pin 16 is fitted into a groove portion provided in the bottom portion of the holder 14, so that the groove portion 13 formed in the lower surface of the cartridge type coating sub-assembly 1 can be fitted to this pin 16 to thereby perform circumferential positioning. Taking the fitting clearance into consideration, the fitting can be reproduced with the accuracy of 20 minutes or less in rotation angle.

The holder 14 has a jacket structure, in which hot water is circulated in the space portion 17 from the hot water inlet 18 to the hot water outlet 19 so as to control the temperature of the coating die 3 and the resin passing through the coating die 3. The resin 20 flows into the nipple-to-coating-die gap 7 from the resin supply tube 21 through the resin introduction port 9 and the resin path 8 so as to be applied to the optical fiber 22 which is drawn from the upper side to the lower side. Instead of the circulation of the hot water, a heater may be employed as temperature controlling means.

When two sets of such coating applicators were used to apply first and second coating layers, the concentricity of the coating (the value obtained by dividing the thinnest value of resin thickness by the thickest value with respect to the same layer) measured for every batch in the condition that the horizontal position and tilt angle of the coating die were not controlled and the cartridge type coating sub-assembly was removed and cleaned stably within a range of ±5% of its initial value in each of the first and second layers, as a result of repetition of ten times. The fluctuation in coating diameter was not more than ±1 μm in its early stage, and this value was kept in the ten-times repetition.

On the contrary, in a conventional coating applicator, the concentricity of coating scattered over ±10% when the horizontal position and tilt angle were not controlled in tentimes repetition. This fluctuation in coating diameter also reached up to ±2 μm when the applicator was installed without controlling its horizontal position and tilt angle.

Figure 3:
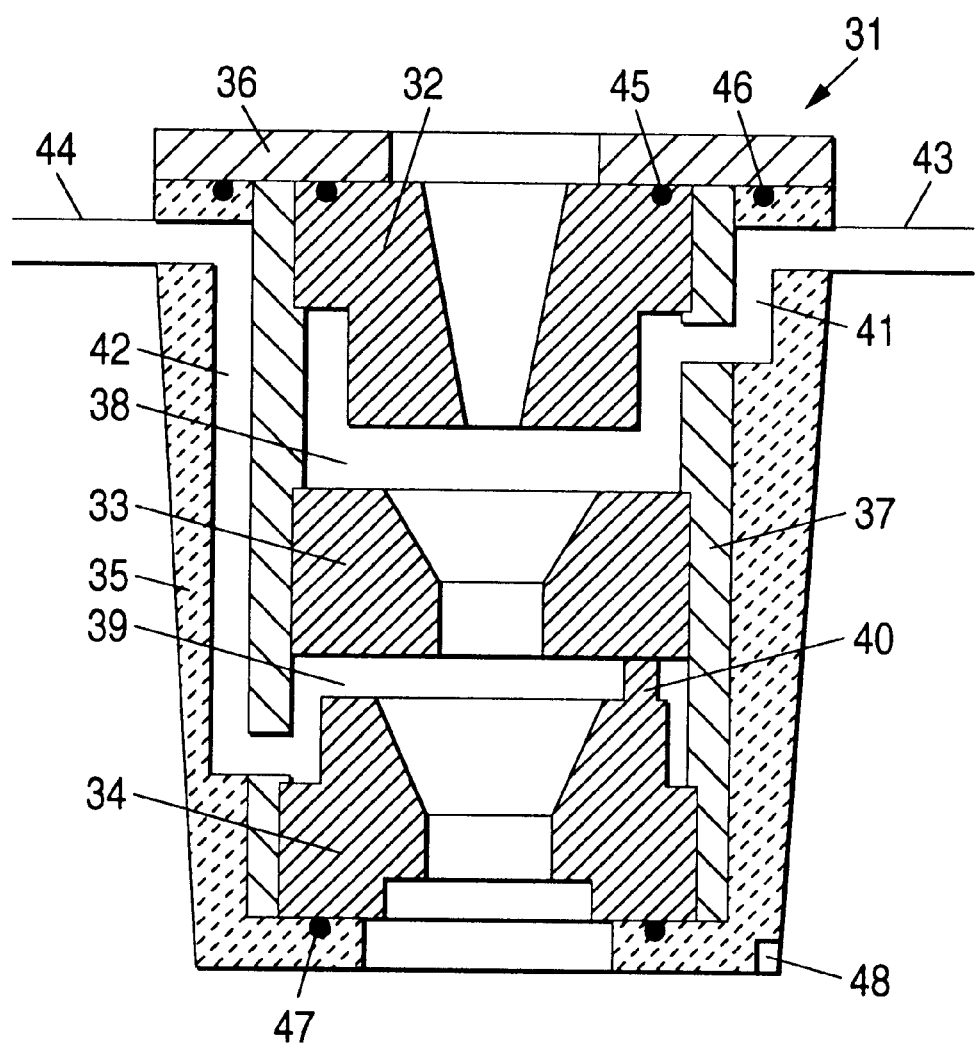
FIG. 3 is a sectional view showing a cartridge type coating sub-assembly used in a resin coating applicator for an optical fiber according to a second embodiment of the present invention.

FIG. 3 is a sectional view of a second embodiment of a cartridge type coating sub-assembly used in a resin coating applicator for an optical fiber according to the present invention. In FIG. 3, the reference numeral 31 represents a cartridge type coating sub-assembly; 32, a nipple; 33, a first coating die; 34, a second coating die; 35, a cup-like member; 36, a lid member; 37, an inner cylindrical member; 38 and 39, gap portions; 40, a protrusion; 41 and 42, resin paths; 43 and 44, resin introduction ports; 45 to 47, O-rings; and 48, a positioning groove. In FIG. 3, parts identical with those in FIG. 1 are indicated by the same references.

This embodiment is an example in which the present invention is applied to a dual coating system for coating an optical fiber with two resin layers at the same time.

The respective outer circumferential surfaces of the nipple 32, the first coating die 33 and the second coating die 34 are formed cylindrically, so that the nipple 32, and the first and second coating dies 33 and 34 are fitted into the respective inner circumferential surfaces of the cylindrical member 37. Each fitting clearance can be made to be about 2 to 3 m, so that the concentricity between the nipple and each coating die can be reproduced with this accuracy. The height of the gap portion 38 between the nipple 32 and the first coating die 33 is positioned by a step portion of the inner cylindrical member 37, and its reproducibility can be made to be not more than 10 $\mu$m. The height of the gap portion 39 between the first coating die 33 and the second coating die 34 is positioned by four circumferential protrusions 40 fitted on the upper surface of the second die, and the reproducibility of the height can be controlled to be not more than 5 $\mu$m. The protrusions 40 may be formed on the lower surface of the first coating die, and the number of the protrusions is not limited to four. Further, since the nipple 32, the first coating die 33 and the second coating die 34 are pressed from their upper and lower sides by the bottom portion of the cup-like member 35 and the lid member 36, there is no fear that the gap portions 38 and 39 are expanded by the pressure with which resin is supplied thereto. That is, the upper end surface of the nipple 32 is made to project upward slightly over the upper end surface of the inner cylindrical member 37, while, in the same way, the lower end surface of the second coating die 34 is made to project downward slightly over the lower end surface of the inner cylindrical member 37. The outer circumferential surface of the inner cylindrical member 37 is cylindrical so as to be fitted into the cylindrical inner circumferential surface of the cup-like member 35 so that the fitting and assembling can be made with the accuracy of 10 $\mu$m or less. Even with such order of accuracy in fitting, there is no fear that the axes of the nipple and the first and second coating dies are tilted in the fitting clearance, because the nipple 32, the first coating die 33 and the second coating die 34 are pressed by the bottom surface of the cup-like member 35 and the lid member 36.

Although such a structure that the lid member 36 is fastened to the cup-like member 35 by a thread is adopted, a flange portion may be provided to be fastened. The resin path 41 for the first resin layer is formed between the cup-like member 35 and the inner cylindrical member 37, so that resin for the first layer is introduced from the resin introduction port 43 into the gap portion 38 between the nipple 32 and the first coating die 33. In addition, resin for the second layer is introduced from the resin introduction port 44 into the resin path 42 passing between the cup-like member 35 and the inner cylindrical member 37 and between the inner cylindrical member 37 and the second coating die 34, and the resin for the second layer is supplied into the gap portion 39 between the first coating die 33 and the second coating die 34. Instead of the resin path provided between the inner cylindrical member 37 and the second coating die 34, alternatively, a resin path passing between the inner cylindrical member 37 and the first coating die 33 may be formed.

The positions of the respective resin paths 41 and 42 are designed so that the resin for the first layer and the resin for the second layer should not flow into each other. Although only one place is illustrated as each of the resin paths 41 and 42, practically resin is put into the gap portions 38 and 39 uniformly from circumferentially provided several inlets. The O-rings 45 to 47 are provided to prevent the resin from leaking out of the cartridge type coating sub-assembly. Suitable material such as metal, resin or the like is used for the O-rings.

The outer circumferential surface of the cup-like member 35 is finished into a tapered shape. In the same manner as in the first embodiment, the positioning groove 48 is cut in one place in the lower surface, so that the cartridge type coating sub-assembly can be positioned accurately in the circumferential direction.

The manner to fit this cartridge type coating sub-assembly 31 in a drawing machine is similar to the manner described in the first embodiment, except that resin supply tubes are connected to the resin introduction ports 43 and 44 respectively so as to supply resins for the first layer and the second layer respectively.

This resin coating applicator was used to apply first and second resin layers at the same time. Next, removing, disassembling, cleaning, assembling, tilting and resin coating were performed repeatedly ten times. Then, the concentricity of coating was stable with scattering within a range of ±5% or less in each of the first and second resin layers. In addition, the fluctuations in coating diameter (the fluctuations in total diameter because of simultaneous coating of the first and second layers) was ±1 $\mu$m or less stably.

Although the resin coating applicator according to the present invention was described about a drawing process in which resin coating is given for protection, the resin coating applicator according to the present invention is not limited to such a drawing process. In a coloring process in which an ink layer is applied to an optical fiber which has been drawn and coated, or in a ribbon making process in which a plurality of colored optical fibers are arranged side by side and resin coating is applied to the whole so that optical fibers are integrated into a ribbon, the cartridge type coating sub-assembly structure and the coating applicator can be used as they are, providing the sectional diameter or sectional shape of a nipple or a coating die is different. Accordingly, the present invention is applicable to such a process as it is.

The positioning structure between the first coating die and the second coating die in this second embodiment may be adopted as the positioning structure between the nipple and the coating die in the first embodiment. In addition, although the inner cylindrical member was used as a positioning member in the above-mentioned embodiments, the cup-like member may be used as a positioning member so as to make the nipple and the coating die fit to the inner circumferential surfaces of the cup-like member directly without using the inner cylindrical member.

As is apparent from the above description, according to the first aspect of the invention, a die having a nipple and a coating die is arranged as a cartridge, and formed to have an outer surface which is truncated-conical so as to be fitted to a holder having a truncated-conical inner surface and fixed to a pass line. Accordingly, it is possible to ensure the reproducibility in fitting accuracy, and it is possible to fit the cartridge type coating sub-assembly to the pass line of the coating machine in a short time. Accordingly, it becomes easy to clean the cartridge type coating sub-assembly in every drawing batch.

According to the second aspect of the invention, circumferentially positioning means are provided in the cartridge type coating sub-assembly and the holder. Accordingly, it is possible to ensure the reproducibility in fitting accuracy in the circumferential direction.

According to the third aspect of the invention, the nipple and the coating die have cylindrical outer circumferential surfaces respectively, and they are positioned by a single positioning member having inner circumferential surfaces to be fitted to the respective cylindrical outer circumferential surfaces. Accordingly, it is possible to control the concentricity of the coating die and the nipple accurately in the cartridge type coating sub-assembly.

According to the fourth aspect of the invention, even in a resin coating applicator having a plurality of coating dies, it is possible to control the concentricity between each coating die and the nipple accurately in the cartridge type coating sub-assembly.

According to the fifth aspect of the invention, the positioning member has a cylindrical outer circumferential surface so that it is fitted in a cup-like member having a truncated-conical outer circumferential surface, and a cylindrical inner circumferential surface is to be fitted to the cylindrical outer circumferential surface of the positioning member. Accordingly, it is possible to assemble the positioning member in the cartridge type coating sub-assembly accurately.

According to the sixth aspect of the invention, a temperature control function is given to the holder side. Accordingly, it is possible to make the nipple and the coating die constituted a cartridge easily.

As has been described above, a cartridge type coating sub-assembly can be fitted into a pass line with high reproducibility of tilt angle and/or horizontal position easily even if it is necessary to perform disassembling, cleaning and cleansing in every batch, and concentricity between a nipple and a coating die can be reproduced easily without requiring centering control in assembling the nipple and the coating die with each other. As a result, it is regarded that an accurate nipple and an accurate coating die are used. Accordingly, there is an effect to provide a resin coating applicator for an optical fiber in which a coated optical fiber with a less fluctuation in coating diameter and superior in concentricity in coating can be manufactured, while the resin coating applicator can have a structure in which temperature control can be made easily, the diameter of coating or the concentricity can be stabilized, and a bubble can be prevented from being mixed into resin.

What is claimed is:

1. A resin coating applicator for an optical fiber, comprising:
   a nipple;
   a coating die;
   a cartridge coating sub-assembly into which said nipple and said coating die are disassemblably assembled; and
   a holder for said cartridge coating sub-assembly having a truncated-conical inner surface fixed to a pass line;
   wherein said cartridge coating sub-assembly has a truncated-conical outer surface fitted to said holder.

2. A resin coating applicator for and optical fiber, comprising:
   a nipple having a cylindrical outer circumferential surface;
   a coating die have a cylindrical outer circumferential surface;
   a single positioning member;
   a cartridge coating sub-assembly comprising said nipple, said coating die and said single positioning member which are disassemblably assembled; and
   a holder for said cartridge coating sub-assembly having a truncated-conical inner surface fixed to a pass line;
   wherein said single positioning member has an inner circumferential surface fitted to the respective cylindrical outer circumferential outer surface of said nipple and said coating die, and said cartridge coating sub-assembly has a truncated-conical outer surface fitted to said holder.

3. A resin coating applicator for an optical fiber according to claim 2, wherein said cartridge coating sub-assembly and said holder have a circumferentially positioning means.

4. A resin coating applicator for an optical fiber according to claim 2, wherein said coating die comprises a first coating die and a second coating die, and said first coating die and said second coating die have cylindrical outer circumferential surfaces respectively so as to be positioned by the single positioning member having inner circumferential surfaces fitted to the respective cylindrical outer circumferential surfaces of said nipple, said first and second coating dies.

5. A resin coating applicator for an optical fiber according to claim 2, wherein said cartridge coating sub-assembly comprises said nipple, said coating die, said single positioning member and a cup-like member having an inner circumferential surface fitted to the outer circumferential surface of said single positioning member.

6. A resin coating applicator for an optical fiber, comprising:
   a nipple having a cylindrical outer circumferential surface;
   a coating die have a cylindrical outer circumferential surface;
   a single positioning member;
   a cartridge coating sub-assembly comprising said nipple, said coating die and said single positioning member which are disassemblably assembled; and
   a holder for said cartridge coating sub-assembly having a truncated-conical inner surface fixed to a pass line;
   wherein said single positioning member has an inner circumferential surface fitted to the respective cylindrical outer circumferential outer surface of said nipple and said coating die, and said cartridge coating sub-assembly has a truncated-conical outer surface fitted to said holder, wherein said holder comprises a temperature control means.

7. A method for applying a resin coating for an optical fiber, comprising:
   a nipple having a cylindrical outer circumferential surface;
   a coating die having a cylindrical outer circumferential surface;
   a cartridge coating sub-assembly into which said nipple and said coating die are disassemblably assembled;
   a single positioning member assembled into said cartridge coating sub-assembly having an inner circumferential surface fitted to the respective cylindrical outer surface of said nipple and said coating die; and
   a holder for said cartridge coating sub-assembly having a truncated-conical inner surface fixed to a pass line;
   said method comprising the steps of:
   drawing an optical fiber from an upper side of said nipple toward the lower side of said coating die;
   supplying a resin to a clearance between said nipple and said coating die to coat the optical fiber with the resin; and
   maintaining respective temperatures of said nipple and said coating die by a temperature controller disposed in said holder to control the temperature of the resin.

* * * * *